(12) United States Patent
Zhang et al.

(10) Patent No.: US 11,994,157 B2
(45) Date of Patent: May 28, 2024

(54) PLUG ASSEMBLY, COMPRESSOR STARTER AND COMPRESSOR ASSEMBLY

(71) Applicant: ANHUI MEIZHI COMPRESSOR CO., LTD., Anhui (CN)

(72) Inventors: Xusheng Zhang, Anhui (CN); Huijun Hu, Anhui (CN)

(73) Assignee: ANHUI MEIZHI COMPRESSOR CO., LTD., Anhui (CN)

( * ) Notice: Subject to any disclaimer, the term of this patent is extended or adjusted under 35 U.S.C. 154(b) by 1132 days.

(21) Appl. No.: 16/740,946

(22) Filed: Jan. 13, 2020

(65) Prior Publication Data

US 2020/0149574 A1 May 14, 2020

Related U.S. Application Data

(63) Continuation of application No. PCT/CN2019/076047, filed on Feb. 25, 2019.

(30) Foreign Application Priority Data

Apr. 18, 2018 (CN) .......................... 201810349999.9
Apr. 18, 2018 (CN) .......................... 201820560525.4

(51) Int. Cl.
  *F16B 19/00* (2006.01)
  *F16B 13/08* (2006.01)
  (Continued)

(52) U.S. Cl.
  CPC ........ *F16B 13/0841* (2013.01); *F16B 19/004* (2013.01); *F16B 19/02* (2013.01);
  (Continued)

(58) Field of Classification Search
  CPC .... F16B 13/0841; F16B 19/004; F16B 19/02; F25B 49/022; H01R 2105/00; H01R 31/06
  See application file for complete search history.

(56) References Cited

U.S. PATENT DOCUMENTS 4,645,278 A   2/1987  Yevak, Jr. et al.
5,131,858 A * 7/1992  Heimbrock ............ H01R 13/53
                                              439/732

(Continued)

FOREIGN PATENT DOCUMENTS

CN    202930596 U    5/2013
CN    204577666 U    8/2015
(Continued)

OTHER PUBLICATIONS

International Search Report dated May 14, 2019 received in International Application No. PCT/CN2019/076047 together with an English language translation.

(Continued)

*Primary Examiner* — Michael C Zarroli
(74) *Attorney, Agent, or Firm* — Scully, Scott, Murphy & Presser, P.C.

(57) ABSTRACT

A plug assembly includes a plug body defining at least one mounting through hole and at least one a connecting post passing through the mounting through hole. Each connecting post has a first end located in the mounting through hole to be configured for plug-in connection with a terminal of a compressor, and a second end extending beyond the mounting through hole to be configured for connection with a control board. A compressor starter can include the plug assembly. A compressor assembly can include the compressor starter.

21 Claims, 4 Drawing Sheets

(51) Int. Cl.
*F16B 19/02* (2006.01)
*F25B 49/02* (2006.01)
*H01R 13/52* (2006.01)

(52) U.S. Cl.
CPC ...... *F25B 49/022* (2013.01); *F04C 2240/803* (2013.01); *H01R 13/521* (2013.01)

(56) References Cited

U.S. PATENT DOCUMENTS

| | | | | |
|---|---|---|---|---|
| 2005/0202720 | A1* | 9/2005 | Burke | H01R 13/521 |
| | | | | 439/578 |
| 2014/0029178 | A1* | 1/2014 | Trudeau, Jr. | H02K 5/225 |
| | | | | 361/679.01 |
| 2017/0207567 | A1* | 7/2017 | Rech | H01R 13/719 |

FOREIGN PATENT DOCUMENTS

| | | |
|---|---|---|
| CN | 204885483 U | 12/2015 |
| CN | 204947114 U | 1/2016 |
| CN | 206098773 U | 4/2017 |
| CN | 107829923 A | 3/2018 |
| CN | 108429036 A | 8/2018 |
| CN | 207994143 U | 10/2018 |
| JP | S58-021989 U | 2/1983 |
| JP | S62-080983 A | 4/1987 |
| JP | 2017-127185 A | 7/2017 |
| JP | 2018-010739 A | 1/2018 |

OTHER PUBLICATIONS

"Hermetic Terminal", Hermetic Sealing Technologies, Shotnippon Co., Ltd., https://www.schott.com/d/epackaging/79de4116-7f19-48e5-889a-38aece732a04/20181014194746/schott-Japan_ep_hermetic-seal-brochure.pdf, Dec. 2017, pp. 1-32.

Notice of Reasons for Refusal dated Dec. 22, 2020 received in Japanese Patent Application No. JP 2019-566958 together with an English language translation.

Notice of the First Review opinion dated Oct. 12, 2023 received in Chinese Patent Application No. CN 201810349999.9.

\* cited by examiner

PLUG ASSEMBLY, COMPRESSOR STARTER AND COMPRESSOR ASSEMBLY

CROSS-REFERENCE TO RELATED APPLICATIONS

This is a continuation application of International Application No. PCT/CN2019/076047, filed on Feb. 25, 2019, claiming priority of Chinese Patent Application Serial No. 201810349999.9 and Chinese Patent Application Serial No. 201820560525.4, filed with the National Intellectual Property Administration of P. R. China on Apr. 18, 2018, the entire contents of which are incorporated herein by reference for all purposes. No new matter is added.

FIELD

The present application relates to the field of compressor technologies, and in particularly to a plug assembly, a compressor starter and a compressor assembly.

BACKGROUND

It is an industrial trend that compressors are becoming more efficient and moving towards simpler and more reliable installation. In related art, most refrigerator compressors are started and protected by ordinary starters and protectors. The ordinary starters have a power consumption of about 2.2 W. In order to reduce power consumption, an electronic starter has come into use for some manufacturers. However, connecting the electronic starter and the compressor is relatively cumbersome.

SUMMARY

The present disclosure seeks to solve at least one of the problems existing in the related art to at least some extent. To this end, the present application proposes a plug assembly with a simple structure. When the plug assembly is applied to a compressor starter, the connection between the compressor starter and the compressor is convenient and reliable.

The present application also provides a compressor starter having the above-mentioned plug assembly.

The present application also provides a compressor assembly having the above-mentioned compressor starter.

A plug assembly according to an embodiment of a first aspect of the present application includes: a plug body defining at least one mounting through hole extending through the plug body; at least one connecting post passing through the mounting through hole, each connecting post having a first end located in the mounting through hole to be configured for plug-in connection with a terminal of the compressor, and a second end extending beyond the mounting through hole to be configured for connection with a control board.

In the plug assembly according to the embodiment of the present application, by providing at least one mounting through hole in the plug body, passing the connecting post into the mounting through hole, and having the first end of the connecting post located in the mounting through hole and the second end of the connecting post extending beyond the mounting through hole, when the plug assembly is applied to the compressor starter, the above-mentioned first end of the connecting post may be in plug-in connection with the terminal of the compressor, and the second end of the connecting post may be connected with the control board of the compressor starter, which facilitates the connection between the compressor starter and the compressor, and guarantees the connection reliability between the compressor starter and the compressor.

According to some embodiments of the present application, three mounting through holes are provided and the three mounting through holes are arranged in a triangle.

According to some embodiments of the present application, the plug body includes three mounting portions spaced apart from one another and arranged in parallel in an axial direction, each of the mounting portions defines one of the above-mentioned mounting through holes through in the axial direction of the mounting portion. The three mounting portions are connected by three first connection plates and three second connection plates. First ends of the three first connection plates are connected and coincide with an incenter of a triangle formed by the connection lines of the centers of the three mounting portions, and a second end of each of the three first connection plates is connected with an outer peripheral wall of the corresponding mounting portion. Two adjacent mounting portions are connected by the second connection plate, and the three first connection plates are located at an inner side of a structure formed by the three second connection plates and the three mounting portions.

According to some embodiments of the present application, an outer contour of a cross section of each of the mounting portions has a circular shape, each of the second connection plates is formed into an arc-shaped plate recessing towards an inside of the triangle formed by the connection lines of the centers of the three mounting portions, and each of the second connection plates is tangent to two of the mounting portions connected thereto.

According to some embodiments of the present application, each of the first connection plates is formed as a flat plate.

According to some embodiments of the present application, a distance between central axes of the two adjacent mounting through holes is x, and the x satisfies: $x=11.6\pm0.5$ mm.

According to some embodiments of the present application, the connecting post includes a first connecting post and a second connecting post that are coaxially disposed, and the mounting through hole includes a first mounting hole and a second mounting hole that are coaxially disposed. The first connecting post is fitted in the first mounting hole, the second connecting post has a part fitted in the second mounting hole and another part extending beyond the second mounting hole, and an outer peripheral wall of the first mounting hole is located at an outer side of an outer peripheral wall of the second mounting hole.

According to some embodiments of the present application, each of the first and second mounting holes is formed as a circular hole, and the first mounting hole has a diameter of d and the d satisfies: $d=2.2\pm0.5$ mm Cross sections of the first and second connecting posts match the first and second mounting holes respectively. The first connecting post has an outer diameter of D, and the D satisfies: $D=2.2\pm0.5$ mm.

According to some embodiments of the present application, the first mounting hole has an axial length of h, and the h satisfies: $h=8.5\pm0.5$ mm.

According to some embodiments of the present application, a step is formed between the first and second mounting holes, a groove is defined at the step, and the groove is annular and surrounds the second mounting hole.

According to some embodiments of the present application, in a radial direction of the mounting through hole, an outer peripheral wall of the groove is flush with the outer peripheral wall of the first mounting hole.

According to some embodiments of the present application, the groove is open towards the first mounting hole.

According to some embodiments of the present application, the first end of the connecting post is open to form a socket, and the socket defines at least one open slot in an outer peripheral wall thereof, and the open slot extends through the outer peripheral wall of the socket.

According to some embodiments of the present application, two open slots are provided, and the two open slots are disposed opposite each other in a radial direction of the connecting post.

According to some embodiments of the present application, the first end of the connecting post has a guide portion, and a cross-sectional area of the guide portion decreases and subsequently increases in an axial direction of the connecting post.

According to some embodiments of the present application, a side of the plug body configured to be adjacent to the control board is provided with at least three bosses, and a free end of the boss is configured to abut against the control board.

According to some embodiments of the present application, each of the bosses is located at an edge of the plug body.

According to some embodiments of the present application, each of the bosses has a height of t, and the t satisfies: t≤6 mm.

A compressor starter according to an embodiment of a second aspect of the present application includes: a control board provided with a control circuit; and a plug assembly according to the embodiments of the first aspect of the present application, in which the second end of the connecting post is connected with the control board.

In the compressor starter according to the embodiment of the present application, by adopting the above-mentioned plug assembly, the compressor starter is connected with the compressor conveniently, and at the same time, the connection reliability between the compressor starter and the compressor is guaranteed.

A compressor assembly according to an embodiment of a third aspect of the present application includes: a compressor having a terminal; and a compressor starter according to the embodiments of the second aspect of the present application, in which the plug assembly is connected with the terminal.

In the compressor assembly according to the embodiment of the present application, by adopting the above-mentioned compressor starter, the assembly of the compressor assembly is facilitated, and an assembly efficiency of the compressor assembly is improved.

Additional aspects and advantages of embodiments of present application will be given in part in the following descriptions, become apparent in part from the following descriptions, or be learned from the practice of the embodiments of the present application.

BRIEF DESCRIPTION OF THE DRAWINGS

The above-mentioned and/or additional aspects and advantages of the present application will become apparent and more readily appreciated from the following descriptions made with reference to the drawings, in which.

REFERENCE NUMERALS compressor assembly 300,
compressor starter 200, compressor 201, terminal 2011,
plug assembly 100, control board 101, control circuit 1011
plug body 1, mounting through hole 10, first mounting hole 10a, second mounting hole 10b, step 10c, groove 10d,
mounting portion 11, first connection plate 12, second connection plate 13, boss 14,
connecting post 2, first connecting post 21, socket 21a, open slot 21b, guide portion 21c, locking member 211, second connecting post 22, guide surface 221

DETAILED DESCRIPTION OF EMBODIMENTS

Reference will be made in detail to embodiments of the present application, and the examples of the embodiments are illustrated in the drawings, wherein the same or similar elements and the elements having same or similar functions are denoted by like reference numerals throughout the descriptions. The embodiments described herein with reference to drawings are illustrative, and merely used to explain the present application. The embodiments shall not be construed to limit the present application.

In the description of the present application, it is to be understood that terms such as "center", "vertical", "horizontal", "length", "width", "thickness", "upper", "lower", "front", "rear", "left", "right", "inner", "outer", "axial", "radial", and "circumferential" should be construed to refer to the orientation as then described or as shown in the drawings under discussion. These relative terms are for convenience of description and do not require that the present application be constructed or operated in a particular orientation, thus cannot be construed to limit the present application. Furthermore, the feature defined with "first" and "second" may include one or more of this feature explicitly or implicitly. In the description of the present application, "a plurality of" means two or more unless otherwise stated.

In the description of the present application, it should be noted that unless specified or limited otherwise, the terms "mounted", "connected", and "coupled" and the like are used broadly, and may be, for example, fixed connections, detachable connections, or integral connections; may also be mechanical or electrical connections; may also be direct connections or indirect connections via intervening structures; may also be inner communications of two elements.

The above terms can be understood by those skilled in the art according to specific situations.

A plug assembly 100 according to an embodiment of a first aspect of the present application is described below with reference to FIGS. 1 to 7.

As shown in FIGS. 1 to 7, the plug assembly 100 according to an embodiment of the present application includes a plug body 1 and at least one connecting post 2.

At least one mounting through hole 10 is defined in the plug body 1, and the connecting post 2 passes through the mounting through hole 10 during operation. A first end of each connecting post 2 is located in the mounting through hole 10 to be adapted for plug-in connection with a terminal 2011 of a compressor 201, and a second end of each connecting post 2 extends beyond the mounting through hole 10 to be adapted for connection with a control board 101.

For example, as shown in FIGS. 1 to 7, the mounting through holes 10 may extend through two axial ends of the plug body 1, and each of the mounting through holes 10 may allow one connecting post 2 to pass through. A part of the connecting post 2 is located in the mounting through 10, and another part of the connecting post 2 extends out of the mounting through hole 10, such that when the plug assembly 100 is applied to a compressor starter 200, an end of the connecting post 2 located in the mounting through hole 10 may be in plug-in connection with the terminal 2011 of the compressor 201 directly, and an end of the connecting post 2 located outside the mounting through hole 10 may be fitted into a mounting hole of the control board 101 of the compressor starter 200 to be fixedly connected to the control board 101, which facilitates the connection between the compressor starter 200 and the compressor 201, and guarantees the connection reliability between the compressor starter 200 and the compressor 201 at the same time.

In the plug assembly 100 according to the embodiment of the present application, by providing at least one mounting through hole 10 in the plug body 1, passing the connecting post 2 into the mounting through hole 10, and having the first end of the connecting post 2 located in the mounting through hole 10 and the second end of the connecting post 2 extending beyond the mounting through hole 10, when the plug assembly 100 is applied to the compressor starter 200, the above-mentioned first end of the connecting post 2 may be in plug-in connection with the terminal 2011 of the compressor 201, and the second end of the connecting post 2 may be connected with the control board 101 of the compressor starter 200, which facilitates the connection between the compressor starter 200 and the compressor 201, and guarantees the connection reliability between the compressor starter 200 and the compressor 201.

In some embodiments of the present application, three mounting through holes 10 are provided and the three mounting through holes are arranged in a triangle. For example, as shown in FIGS. 1 to 5, on a cross section of the plug assembly 100, projections of central axes of two adjacent mounting through holes 10 are connected by a straight line to form a triangle, such that the plug body 1 has a simple structure and the plug assembly 100 is better adapted to the terminal 2011 of the compressor 201.

For example, in the example of FIGS. 1-5, the three mounting through holes 10 are arranged in a regular triangle. That is, on a cross section of the plug assembly 100, projections of central axes of two adjacent mounting through holes 10 are connected by a straight line to form a regular triangle, thereby simplifying the structure of the plug body 1 and facilitating the processing of the plug body 1. At the same time, the three connecting posts 2 are arranged in a regular triangle, such that the plug assembly 100 is better adapted to the conventional terminal 2011 of the compressor 201, which improves the applicability of the plug assembly 100.

In some embodiments of the present application, as shown in FIGS. 1 to 5, the plug body 1 includes three mounting portions 11 spaced apart from one another and arranged in parallel in the axial direction. The three mounting portions 11 may be arranged in a triangle, and each of the mounting portions 11 defines one mounting through hole 10 penetrating in the axial direction of the mounting portion 11. The three mounting portions 11 are connected by three first connection plates 12 and three second connection plates 13. In the axial direction of the plug body 1, the first connection plate 12, the second connection plate 13 and the mounting portion 11 may have the same length. First ends of the three first connection plates 12 are connected and coincide with an incenter of a triangle formed by the connection lines of the centers of the three mounting portions 11, and a second end of each of the three first connection plates 12 is connected with an outer peripheral wall of the corresponding mounting portion 11, thereby connecting the three mounting portions by the three first connection plates 12, and supporting the corresponding mounting portion 11 by the three first connection plates 12, so as to increase the strength of the plug body 1. Two adjacent mounting portions 11 are connected by the second connection plate 13. That is, a first end of the second connection plate 13 is connected with one of the two adjacent mounting portions 11, a second end of the second connection plate 13 is connected with the other of the two adjacent mounting portions 11, and the three first connection plates 12 are located at an inner side of a structure formed by the three second connection plates 12 and the three mounting portions 11, which, therefore, further simplifies the structure of the plug body 1 and guarantees the strength of the plug body 1.

For example, in the example of FIGS. 1 to 5, the three mounting through holes 10 are arranged in a regular triangle. The first ends of the three first connection plates 12 are connected and coincide with an incenter of the regular triangle formed by the connection lines of the centers of the three mounting portions 11.

For example, as shown in FIGS. 1 to 5, an outer contour of a cross section of each of the mounting portions 11 has a circular shape, each of the second connection plates 13 is formed into an arc-shaped plate recessing towards an inside of the triangle formed by the connection lines of the centers of the three mounting portions 11, and each of the second connection plates 13 is tangent to two of the mounting portions 11 connected thereto. A first end of an outer surface of the second connection plate 13 may be tangent to an outer peripheral wall of one of the two mounting portions 11 connected thereto, and a second end of the outer surface of the second connection plate 13 may be tangent to an outer peripheral wall of the other of the two mounting portions 11 connected thereto, such that the second connection plate 13 is rounded off between the two mounting portions 11 connected thereto, which enables the plug body 1 to be gripped comfortably and is convenient for a user to operate.

It is understood that each of the second connection plates 13 may also be formed as a flat plate to simplify the structure of the second connection plate 13 and also facilitate the operation of the user.

For example, each of the first connection plates 12 is formed as a flat plate, thereby further simplifying the structure of the plug body 1 in addition to guaranteeing the strength of the plug body 1, which saves materials of the plug body 1 and reduces costs.

In some embodiments of the present application, as shown in FIGS. 1 to 5, the central axes of the three mounting through holes 10 are in parallel to one another, and a distance between the central axes of the two adjacent mounting through holes 10 is x; and the x satisfies: x=11.6±0.5 mm That is, 11.1 mm≤x≤12.1 mm, such that an appropriate processing accuracy exists between the mounting through holes 10, and the mounting through hole 10 can be processed conveniently. At the same time, since the central axes of two adjacent of the three binding posts of the conventional terminal 2011 of the compressor 201 has a distance of 11.66 mm, the plug assembly 100 is better adapted to the conventional terminal 2011 of the compressor 201, guaranteeing the universality of the plug assembly 100, the connection reliability between the plug assembly 100 and the terminal 2011, and a ready operation of the compressor 201. It has been discovered through experiments that, by providing the mounting through holes, in accordance with the above ranges of dimensions, the connection reliability and the operability of the plug assembly and the compressor can be unexpectedly improved.

In some embodiments of the present application, the connecting post 2 includes a first connecting post 21 and a second connecting post 22 that are disposed coaxially, and the mounting through hole 10 includes a first mounting hole 10a and a second mounting hole 10b that are disposed coaxially. The first connecting post 21 is fitted in the first mounting hole 10a, a part of the second connecting post 22 is fitted in the second mounting hole 10b, and another part of the second connecting post 22 extends beyond the second mounting hole 10b. The outer peripheral wall of the first mounting hole 10a is located at an outer side of the second mounting hole 10b. For example, as shown in FIGS. 1 to 7, the mounting through hole 10 may be formed as a stepped hole, the first connecting post 21 may be fitted with the first mounting hole 10a, and the second connecting post 22 may be fitted with the second mounting hole 10b. The outer peripheral wall of the first connecting post 21 may be located at an outer side of the outer peripheral wall of the second mounting hole 10b. When passing through the mounting through hole 10 from one side of the mounting through hole 10, the connecting post 2 may not extend out of the other side of the mounting through hole 10. Therefore, when the plug assembly 100 is applied to the compressor starter 200 and the first end of the second connecting post 22 protruding from the mounting through hole 10 is connected with the control board 101, the connecting post 2 may limit the movement of the plug body 1 in its axial direction to prevent the plug body 1 from being disengaged from the connecting post 2 and guarantee the reliability of the plug assembly 100.

Figure 4:
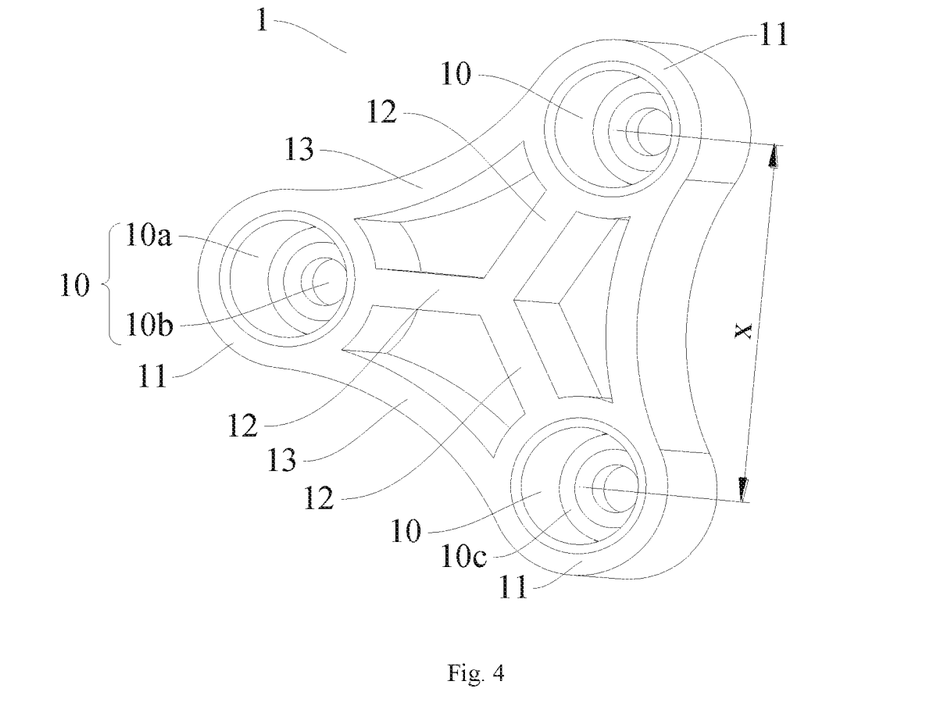
FIG. 4 is a schematic structural view of a plug body shown in FIG. 3.
Figure 5:
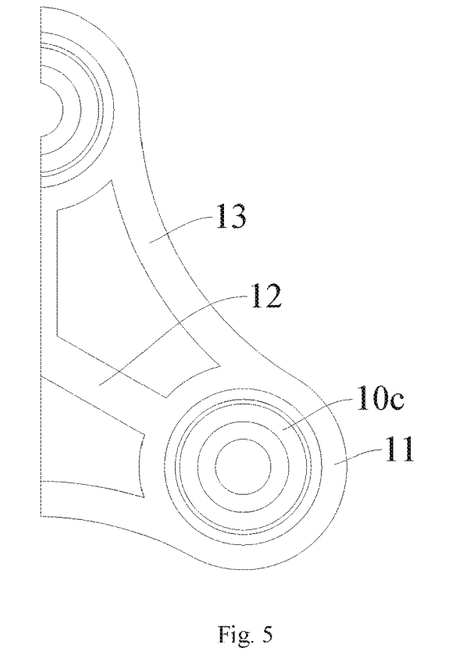
FIG. 5 is a schematic partial view of a plug body shown in FIG. 4.
Figure 6:
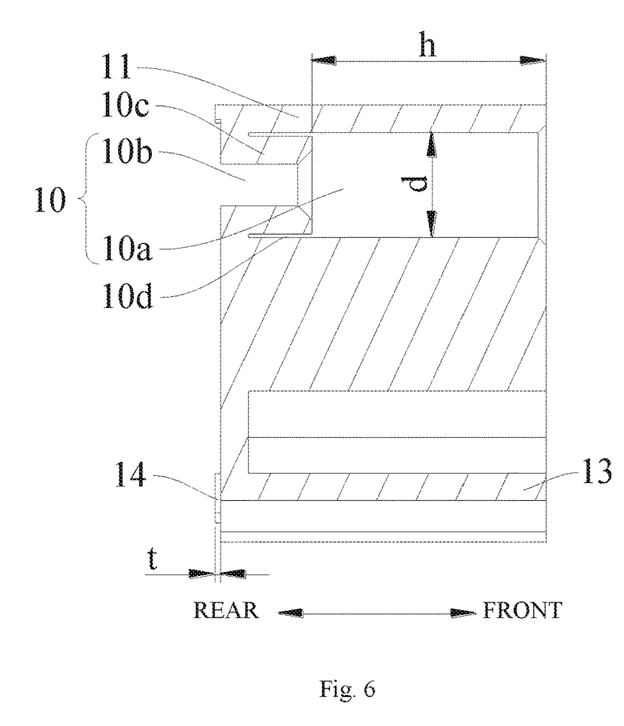
FIG. 6 is a sectional view of the plug body shown in FIG. 4.

For example, as shown in FIGS. 4 and 6, each of the first and second mounting holes 10a and 10b is formed as a circular hole, so as to process the first and second mounting holes 10a and 10b conveniently. The first mounting hole 10a has a diameter of d and the d satisfies: d=2.2±0.5 mm That is, 1.7 mm≤d≤2.7 mm, such that the first mounting hole 10a has an appropriate processing accuracy, and a diameter of the second mounting hole 10b is less than the diameter of the first mounting hole 10a. Cross sections of the first and second connecting posts 21 and 22 match the first and second mounting holes 10a and 10b respectively, such that the outer peripheral walls of the first and second connecting posts 21 and 22 are formed into circle. The first connecting post 21 has an outer diameter of D, and the D satisfies: D=2.2±0.5 mm That is, 1.7 mm≤D≤2.7 mm, and the outer diameter of the second connecting post 22 is less than the outer diameter of the first connecting post 21. Therefore, the first connecting post 21 has a proper processing accuracy, and may be fitted well with the first mounting hole 10a. At the same time, the first connecting post 21 may be adapted better to the conventional terminal 2011 of the compressor 201, which guarantees the universality of the plug assembly 100. It has been discovered through experiments that, by providing the mounting through holes and the connecting posts, in accordance with the above ranges of dimensions, the connection reliability and the operability of the plug assembly and the compressor can be unexpectedly improved.

In some embodiments of the present application, as shown in FIG. 6, the first mounting hole 10a has an axial length of h, and the h satisfies: h=8.5±0.5 mm That is, 8 mm, such that the first mounting hole 10a has an appropriate processing accuracy, and at the same time, the terminal 2011 of the compressor 201 may extend into the first mounting hole 10a to be in plug-in connection with the first connecting post 21, such that the first mounting hole 10a may protect the first connecting post 21 and the terminal 2011 of the compressor 201 to some extent, ensuring the connection reliability between the terminal 2011 of the compressor 201 and the connecting post 2.

For example, in the example of FIG. 6, the first and second mounting holes 10a and 10b form a step 10c therebetween, a groove 10d is defined at the step 10c, and the groove 10d is annular and surrounds the second mounting hole 10b. The groove 10d may partially recess toward the other axial end of the step 10c from a partial surface of an axial end of the step 10c, with a cylindrical structure and forming an internal and external partition with the second mounting hole 10b. Therefore, when the plug assembly 100 is applied to the compressor starter 200 to be connected to the compressor 201, during the assembly process, the connecting post 2 is inclined with respect to the mounting through hole 10 due to an external force. At this point, the groove 10d is deformed, such that the connecting post 2 and the mounting through hole 10 may not be disposed coaxially. Thus, by providing the annular groove 10d at the step 10c, the deformation of the groove 10d reduces an applied force between the connecting post 2 and the mounting through hole 10, and avoids damages to the connecting post 2 or the mounting through hole 10 due to a relatively great applied force therebetween, and effectively protects the connecting post 2 and the plug body 1.

In some embodiments of the present application, as shown in FIG. 6, in the radial direction of the mounting through hole 10, the outer peripheral wall of the groove 10d is flush with the outer peripheral wall of the first mounting hole 10a. That is, on the cross section of the mounting through hole 10, a projection of the outer peripheral wall of the groove 10d has the same shape and size as a projection of the outer peripheral wall of the first mounting hole 10a, thereby facilitating the processing of the groove 10d.

It is understood that in the radial direction of the mounting through hole 10, the outer peripheral wall of the groove 10d may not be flush with the outer peripheral wall of the first mounting hole 10a. For example, in the radial direction of the mounting through hole 10, the outer peripheral wall of the groove 10d may also be located at an inner side of the outer peripheral wall of the first mounting hole 10a, which may also protect the connecting post 2 and the plug body 1 effectively. In addition, the groove 10d may be or may be not provided coaxially with the mounting through hole 10.

In some embodiments of the present application, the groove 10d is open towards the first mounting hole 10a. For example, in the example of FIG. 6, the side of the groove 10d back to the first mounting hole 10a is sealed, and the side of the groove 10d facing the first mounting hole 10a is open, such that the side of the groove 10d facing the first mounting hole 10a may be moved relative to the first mounting hole 10a by a certain distance to deform the groove 10d, which ensures that the deformation of the groove 10d may reduce the applied force between the connecting post 2 and the mounting through hole 10.

A cross-sectional shape and size, and an axial depth of the groove 10d may be set specifically according to actual conditions to better meet actual needs.

In other embodiments of the present application, the side of the groove 10d toward the first mounting hole 10a is sealed, and the side of the groove 10d back to the first mounting hole 10a is open, such that the side of the groove 10d back to the first mounting hole 10a may be moved relative to the first mounting hole 10a by a certain distance to deform the groove 10d, which may also ensure that the deformation of the groove 10d may reduce the applied force between the connecting post 2 and the mounting through hole 10.

Figure 3:
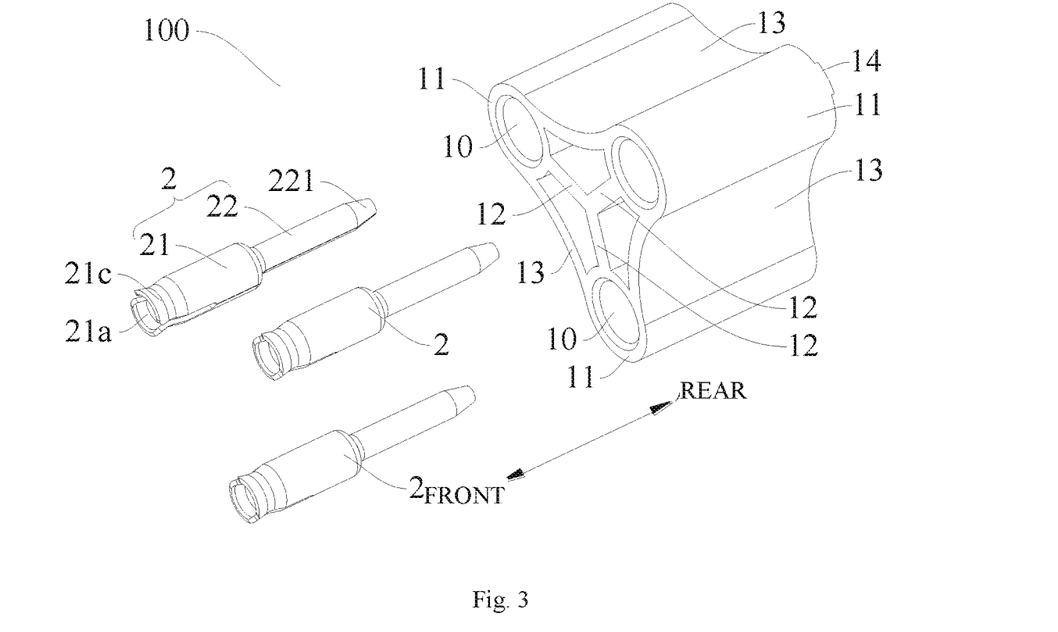
FIG. 3 is an exploded view of the plug assembly shown in FIG. 1.
Figure 7:
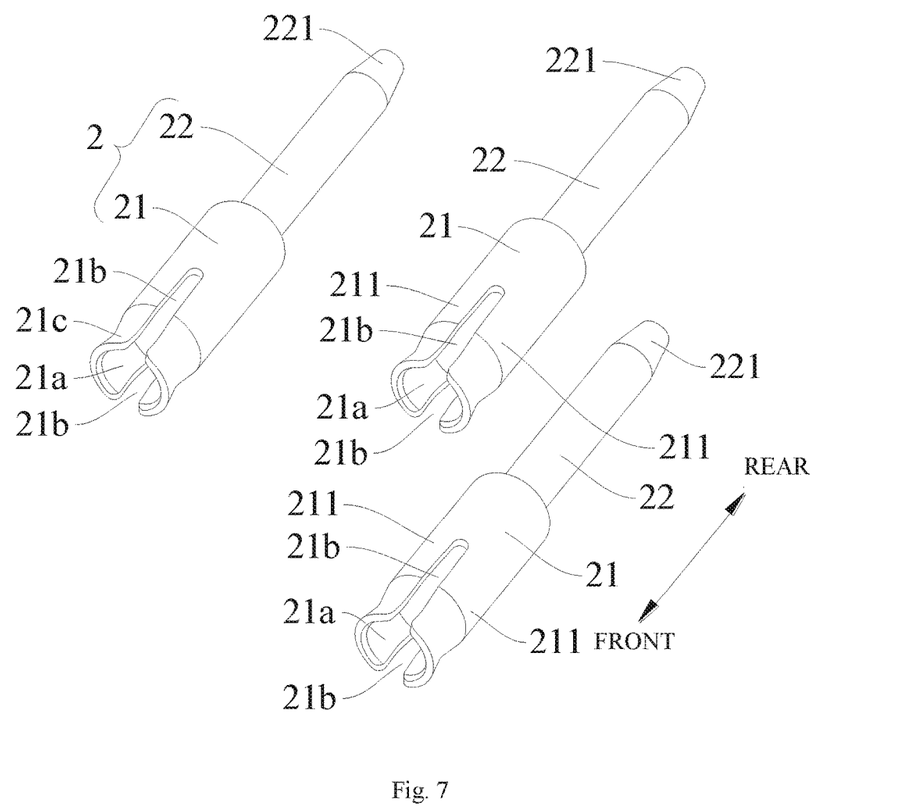
FIG. 7 is a schematic structural view of a connecting post shown in FIG. 4.

In some embodiments of the present application, the first end of the connecting post 2 is open to form a socket 21a. The socket 21a defines at least one open slot 21b in an outer peripheral wall thereof, and the open slot extends through the outer peripheral wall of the socket 21a. For example, as shown in FIGS. 3 and 7, the socket 21a may recess toward the above-mentioned second end of the connecting post 2 from a part of an end surface of the above-mentioned first end of the connecting post 2, and the terminal 2011 of the compressor 201 may be in plug-in connection into the socket 21a; the open slot 21b may also recess toward the above-mentioned second end of the connecting post 2 from a part of an end surface of the above-mentioned first end of the connecting post 2. The open slot 21b may penetrate through the outer peripheral wall of the socket 21a from inside out, and is communicated with the socket 21a. Since the terminal 2011 of the compressor 201 is inserted into the socket 21a to deform the open slot 21b, such that the distance between the two opposite side walls of the open slot 21b in a circumferential direction of the connecting post 2 is increased, the terminal 2011 may be closely fitted in the socket 21a, such that the terminal 2011 and the socket 21a are fastened automatically, which improves the connection reliability between the connecting post 2 and the terminal 2011 of the compressor 201, facilitates the terminal 2011 of the compressor 201 to be inserted in the socket 21a and improves the assembly efficiency.

For example, as shown in FIGS. 3 and 7, two open slots 21b are provided, and the two open slots 21b are disposed opposite each other in the radial direction of the connecting post 2, such that two locking members 211 disposed opposite to each other in the radial direction of the connecting post 2 are formed at the above-mentioned first end of the connecting post 2. When the terminal 2011 of the compressor 201 is inserted into the socket 21a, the distance between the two locking members 211 is increased, such that the terminal 2011 is closely fitted in the socket 21a, and the terminal 2011 is fastened with the socket 21a automatically, which guarantees the reliable connection between the connecting post 2 and the terminal 2011 of the compressor 201.

It is understood that one, three, four, or more open slot(s) 21b may also be provided. When a plurality of open slots 21b is provided, the plurality of open slot 21b may be arranged at intervals in the circumferential direction of the connecting post 2; wherein when two open slots 21b are provided, the two open slots 21b may not be disposed opposite to each other in the radial direction of the connecting post 2.

In some embodiments of the present application, the first end of the connecting post 2 is provided with a guide portion 21c, and the cross-sectional area of the guide portion 21c decreases initially and increases subsequently in the axial direction of the connecting post 2. For example, in the examples of FIGS. 3 and 7, the guide portion 21c may be formed in a cylindrical structure substantially, and the cross-sectional area of the cylindrical structure decreases initially and increases subsequently in the axial direction of the connecting post 2, such that the guide portion 21c has a flare opening formed at an end portion. When the plug assembly 100 is applied to the compressor starter 200, the binding post of the terminal 2011 of the compressor 201 is inserted into the first connecting post 21 conveniently.

Figure 1:
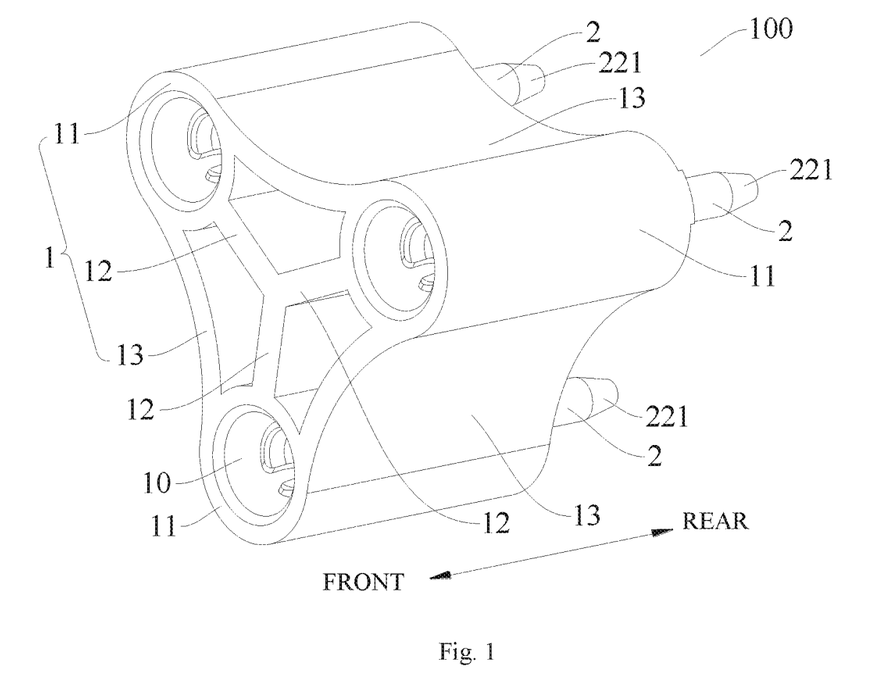
FIG. 1 is a schematic structural view of a plug assembly according to an embodiment of the present application.
Figure 2:
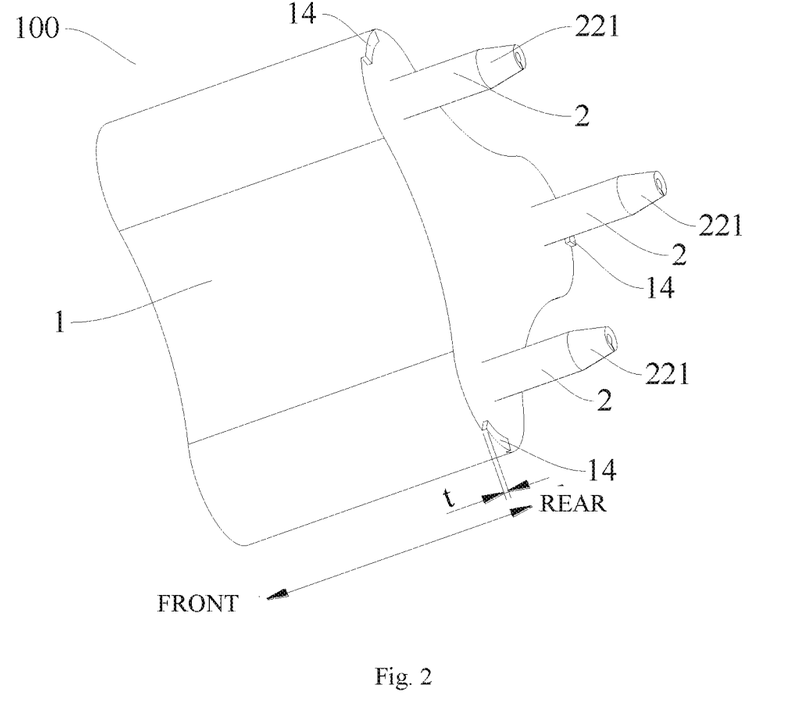
FIG. 2 is a schematic structural view of the plug assembly shown in FIG. 1 from another perspective.

In some embodiments of the present application, a side of the plug body 1 adjacent to the control board 101 is provided with at least three bosses 14, and a free end (or a terminal end) of the boss 14 abuts against the control board 101. For example, as shown in FIGS. 2, 3, and 6, the boss 14 may protrude in the axial direction of the plug body 1 from a part of the surface of one side of the plug body 1 adjacent to the control board 101. When the plug assembly 100 is applied to the compressor starter 200, an end surface of the free end of the boss 14 is in abutment with the control board 101, which positions the plug assembly 100 relative to the control board 101, and facilitates the quick connection between the plug assembly 100 and the control board 101. Meanwhile, the end surface of the free end of the boss 14 abuts against the control board 101, such that a contact surface formed between the plug assembly 100 and the control board 101 is relatively flat, which avoids the relatively great applied force between the plug assembly 100 and the control board 101 due to uneven surfaces thereof and reduces stress deformation of the plug assembly 100 and the control board 101; moreover, since the end surface of the free end of the boss 14 abuts against the control board 101, one side surface of the plug body 1 adjacent to the control board 101 and the control board 101 are arranged at intervals, which contributes to heat dissipation of the control board 101 and guarantees the reliable operation of the compressor starter 200.

Here, it should be noted that the "contact surface formed between the plug assembly 100 and the control board 101" refers to a plane defined by the free ends (or terminal ends) of the at least three bosses 14. Each of the bosses 14 has a height of t, and the t satisfies t≤0.6 mm, such that the boss 14 has a proper height, which avoids the increased occupied space of the plug assembly 100 due to the over-height of the boss 14. The heights of the bosses 14 may be equal or unequal; t may be equal to 0. That is, at this point, no boss 14 is provided at the side of the plug body 1 adjacent to the control board 101.

For example, as shown in FIGS. 2, 3, and 6, each of the bosses 14 is located at an edge of the plug body 1, and a relatively great distance may exist between the two bosses 14, such that the plug body 1 has good stability when the plug assembly 100 is connected with the control board 101.

Figure 8:
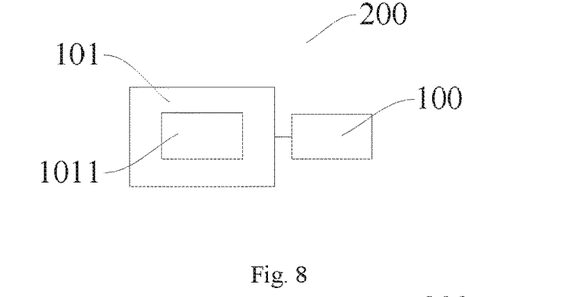
FIG. 8 is a schematic structural view of a compressor starter according to an embodiment of the present application.

A compressor starter 200 according to an embodiment of a second aspect of the present application includes the control board 101 and the plug assembly 100, wherein the control board 101 is provided with a control circuit 1011, and the second end of the connecting post 2 of the plug assembly 100 according to the above-mentioned embodiment of the first aspect of the present application is connected with the control board 101. When the compressor starter 200 is connected to the compressor 201, the control circuit 1011 may control the startup of the compressor 201. The compressor starter 200 may be an electronic starter, which may reduce the power consumption of the compressor starter 200.

In the compressor starter 200 according to the embodiment of the present application, by adopting the above-mentioned plug assembly 100, the compressor starter 200 can be rapidly connected with the compressor 201 conveniently, and the reliable connection between the compressor starter 200 and the compressor 201 is guaranteed at the same time.

Figure 9:
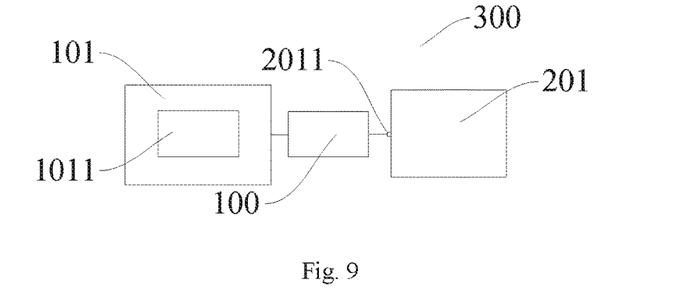
FIG. 9 is a schematic structural view of a compressor assembly according to an embodiment of the present application.

A compressor assembly 300 according to an embodiment of a third aspect of the present application includes the compressor 201 and the compressor starter 200 according to the embodiment of the second aspect of the present application, wherein the compressor 201 has the terminal 2011, and the plug assembly 100 is in plug-in connection with the terminal 2011.

In the compressor assembly 300 according to the embodiment of the present application, by adopting the above-mentioned compressor starter 200, the assembly of the compressor assembly 300 is facilitated, and the assembly efficiency of the compressor assembly 300 is improved.

Other configurations and operations of the compressor assembly 300 according to the embodiment of the present application are known to those skilled in the art, and will not be described in detail herein.

The plug assembly 100 according to an embodiment of the present application will be described in detail below referring to FIGS. 1 to 7 with an embodiment. It is to be understood that the following description is merely exemplary, instead of a specific limitation to the present application.

As shown in FIGS. 1 to 7, the plug assembly 100 includes a plug body 1 and three connecting posts 2. The plug body 1 is an insulating part, for example, a plastic part, and the connecting post 2 is a conductive part, for example, a metal part. The plug body 1 includes three mounting portions 11 spaced apart one another and arranged in parallel, the three mounting portions 11 are arranged in a triangle, an outer contour of a cross section of each of the mounting portions 11 has a circular shape, and one of the mounting through holes 10 penetrating in the axial direction of the mounting portion 11 is formed at each of the mounting portions 11, such that the three mounting through holes 10 are arranged in a triangle, a distance between central axes of the two adjacent mounting through holes 10 is x, and for x, the following equation is satisfied: x=11.6±0.5 mm, i.e., 11.1 mm≤x≤12.1 mm. The three mounting portions 11 are connected using three first connection plates 12 and three second connection plates 13. In the axial direction of the plug body 1, the first connection plate 12, the second connection plate 13 and the mounting portion 11 may have the same length. The first ends of the three first connection plates 12 are connected and coincide with an incenter of a triangle formed by the connection lines of the centers of the three mounting portions 11, and the second end of each of the three first connection plates 12 is connected with an outer peripheral wall of the corresponding mounting portion 11, such that each of the first connection plates 12 extends along three angular bisectors of the above-mentioned regular triangle; two adjacent mounting portions 11 are connected using the second connection plate 13, each of the second connection plates 13 is formed into an arc-shaped plate recessing toward the center of the regular triangle formed by the connection lines of the centers of the three mounting portions 11, each of the second connection plates 13 is tangent to two of the mounting portions 11 connected thereto, and the three first connection plates 12 are located at an inner side of a structure formed by the three second connection plates 13 and the three mounting portions 11.

The three connecting posts 2 pass through the three mounting through holes 10 in one-to-one correspondence, the first end (for example, a front end as shown in FIG. 3) of the connecting post 2 is located in the mounting through hole 10 to be suitable for plug-in connection with the terminal 2011 of the compressor 201, and the second end (for example, a rear end as shown in FIG. 3) of each connecting post 2 extends beyond the mounting through hole 10 to be suitable for fixed connection with the control board 101.

For example, as shown in FIGS. 1 to 7, the connecting post 2 includes a first connecting post 21 and a second connecting post 22 which are disposed coaxially. The rear end of the first connecting post 21 is connected to the front end of the second connecting post 22. The connecting post 21 is formed in a hollow structure, such that the front end of the first connecting post 21 is formed as a socket 21a. The second connecting post 22 may be formed in a solid structure or a hollow structure. A guide surface 221 is formed as a truncated cone surface substantially at the rear end of the second connecting post 22, such that the connecting post 2 passes through the mounting through hole 10. The mounting through hole 10 is formed as a stepped hole and includes a first mounting hole 10a and a second mounting hole 10b that are disposed coaxially, and the first and second mounting holes 10a and 10b are each formed as a circular hole. The diameter of the first mounting hole 10a is d=2.2±0.5 mm, i.e., 1.7 mm≤d≤2.7 mm. The axial length of the first mounting hole 10a is h=8.5±0.5 mm, i.e., 8 mm≤h≤9 mm. The first connecting post 21 is fitted in the first mounting hole 10a, and the outer diameter D of the first connecting post 21 is D=2.2±0.5 mm, i.e., 1.7 mm≤D≤2.7 mm. The front end of the second connecting post 22 is fitted in the second mounting hole 10b. The rear end of the connecting post 22 extends beyond the second mounting hole 10b, and the diameter of the first mounting hole 10a is greater than the diameter of the second mounting hole 10b. It has been discovered through experiments that, by providing the mounting through holes and the connecting posts, in accordance with the above ranges of dimensions, the connection reliability and the operability of the plug assembly and the compressor can be unexpectedly improved.

As shown in FIG. 6, the step 10c is formed between the first and second mounting holes 10a and 10b, the groove 10d is formed at the step 10c, and the groove 10d is annular and surrounds the second mounting hole 10b. The groove 10d recesses toward the rear end of the step 10c from a part of the surface at the front end of the step 10c, such that the side of the groove 10d facing the first mounting hole 10a is open, and the side of the groove 10d back to the first mounting hole 10a is sealed. The groove 10d has a substantially cylindrical structure, forming an internal and external partition with the second mounting hole 10b. In the radial direction of the mounting through hole 10, the outer peripheral wall of the groove 10d is flush with the outer peripheral wall of the first mounting hole 10a.

As shown in FIGS. 3 and 7, two open slots 21b are formed at the outer peripheral wall of the socket 21a, and are disposed opposite to each other in the radial direction of the connecting post 2, such that two locking members 211 disposed opposite to each other in the radial direction of the connecting post 2 are formed at the above-mentioned first end of the connecting post 2. Each of the open slots 21b penetrates through the outer peripheral wall of the socket 21a. The front end of the locking member 211 has a guide portion 21c, the cross-sectional area of which decreases initially and increases subsequently in the axial direction of the connecting post 2.

For example, as shown in FIGS. 2, 3, and 6, three bosses 14 are provided at one side of the plug body 1 adjacent to the control board 101, and each located at an edge corresponding to the rear end of the mounting portion 11. The outer surface of each of the bosses 14 is flush with a part of the outer peripheral wall of the corresponding mounting portion 11; each boss 14 has a height of t≤0.6 mm, and the end surface of the free end of the boss 14 is formed as a flat surface. When the plug assembly 100 is applied to the compressor starter 200, the end surface of the free end of the boss 14 abuts against the control board 101, and at this point, the rear end of the second connecting post 22 passes through the mounting hole of the control board 101 to be welded to the control board 101.

The plug assembly 100 according to the embodiment of the present application has a simple structure and good structural strength. When the plug assembly 100 is applied to the compressor starter 200, the front end of the connecting post 2 may be in plug-in connection to the terminal 2011 of the compressor 201, and the rear end of the connecting post 2 may be connected to the control board 101 of the compressor starter 200, which facilitates the connection between the compressor starter 200 and the compressor 201, and guarantees the connection reliability between the compressor starter 200 and the compressor 201.

In the description of the present specification, reference throughout this specification to "an embodiment", "some embodiments", "exemplary embodiment", "example", "specific example" or "some examples" means that a particular feature, structure, material, or characteristic described in connection with the embodiment or example is included in at least one embodiment or example of the present invention. In the specification, the schematic expressions to the above-mentioned terms are not necessarily referring to the same embodiment or example. Furthermore, the described particular features, structures, materials, or characteristics may be combined in any suitable manner in one or more embodiments or examples.

Although embodiments of the present invention have been shown and illustrated, it shall be understood by those skilled in the art that various changes, modifications, alternatives and variants without departing from the principle and idea of the present disclosure are acceptable. The scope of the present application is defined by the claims and its equivalents.

We claim:

1. A plug assembly comprising:
   a plug body defining at least one mounting through hole extending through the plug body; and
   at least one connecting post passing through the mounting through hole, the connecting post having a first end located in the mounting through hole to be configured for plug-in connection with a terminal of a compressor, and a second end extending beyond the mounting through hole to be configured for connection with a control board,
   wherein:
   the at least one mounting through hole comprises three mounting through holes arranged in a triangle; the plug body comprises three mounting portions spaced apart from one another and arranged in parallel in an axial direction;
   each of the mounting portions defines one of the mounting through holes through in the axial direction of the mounting portion, and the three mounting portions are connected by three first connection plates and three second connection plates;
   first ends of the three first connection plates are connected and coincide with an incenter of a triangle formed by the connection lines of the centers of the three mounting portions, and a second end of each of the three first connection plates is connected with an outer peripheral wall of the corresponding mounting portion; and
   two adjacent mounting portions are connected by the second connection plate, and the three first connection plates are located at an inner side of a structure formed by the three second connection plates and the three mounting portions.

2. The plug assembly according to claim 1, wherein:
   an outer contour of a cross section of each of the mounting portions has a circular shape;
   each of the second connection plates is formed into an arc-shaped plate recessing towards an inside of the triangle formed by the connection lines of the centers of the three mounting portions; and
   each of the second connection plates is tangent to two of the mounting portions connected thereto.

3. The plug assembly according to claim 1, wherein each of the first connection plates comprises a flat plate.

4. The plug assembly according to claim 1, wherein the three mounting through holes are arranged in a regular triangle, a distance between central axes of the two adjacent mounting through holes is x, and the x satisfies: $x=11.6\pm0.5$ mm.

5. The plug assembly according to claim 1, wherein:
   the connecting post comprises a first connecting post and a second connecting post coaxially disposed, and the mounting through hole comprises a first mounting hole and a second mounting hole coaxially disposed; and
   the first connecting post is fitted in the first mounting hole, the second connecting post comprises a part fitted in the second mounting hole and another part extending beyond the second mounting hole, and an outer peripheral wall of the first mounting hole is located at an outer side of an outer peripheral wall of the second mounting hole.

6. The plug assembly according to claim 5, wherein:
   each of the first and second mounting holes comprises a circular hole, and the first mounting hole has a diameter of d and the d satisfies: $d=2.2\pm0.5$ mm; and
   cross sections of the first and second connecting posts match the first and second mounting holes respectively, and the first connecting post has an outer diameter of D, and the D satisfies: $D=2.2\pm0.5$ mm.

7. The plug assembly according to claim 5, wherein the first mounting hole has an axial length of h, and the h satisfies: $h=8.5\pm0.5$ mm.

8. The plug assembly according to claim 5, wherein a step is provided between the first and second mounting holes, a groove is defined at the step, and the groove is annular and surrounds the second mounting hole.

9. The plug assembly according to claim 8, wherein in a radial direction of the mounting through hole, an outer peripheral wall of the groove is flush with the outer peripheral wall of the first mounting hole.

10. The plug assembly according to claim 8, wherein the groove is open towards the first mounting hole.

11. The plug assembly according to claim 1, wherein the first end of the connecting post is open to form a socket, the socket defines at least one open slot in an outer peripheral wall thereof, and the open slot extends through the outer peripheral wall of the socket.

12. The plug assembly according to claim 11, wherein the at least one open slot comprises two open slots, and the two open slots are disposed opposite each other in a radial direction of the connecting post.

13. The plug assembly according to claim 11, wherein the first end of the connecting post comprises a guide portion, and a cross-sectional area of the guide portion decreases and subsequently increases in an axial direction of the connecting post.

14. The plug assembly according to claim 1, wherein a side of the plug body configured to be adjacent to the control board is provided with at least three bosses, and a free end of the boss is configured to abut against the control board.

15. The plug assembly according to claim 14, wherein each of the bosses is located at an edge of the plug body.

16. The plug assembly according to claim 14, wherein each of the bosses has a height of t, and the t satisfies: t≤0.6 mm.

17. A compressor starter comprising:
the control board, wherein the control board comprises a control circuit; and
the plug assembly according to claim 1, wherein the second end of the connecting post is connected with the control board.

18. A compressor assembly comprising:
the compressor having the terminal; and
the compressor starter according to claim 17, wherein the plug assembly is connected with the terminal.

19. A plug assembly comprising:
a plug body defining at least one mounting through hole extending through the plug body; and
at least one connecting post passing through the mounting through hole, the connecting post having a first end located in the mounting through hole to be configured for plug-in connection with a terminal of a compressor, and a second end extending beyond the mounting through hole to be configured for connection with a control board,
wherein:
the at least one connecting post comprises a first connecting post and a second connecting post coaxially disposed, and the at least one mounting through hole comprises a first mounting hole and a second mounting hole coaxially disposed;
the first connecting post is fitted in the first mounting hole, the second connecting post comprises a part fitted in the second mounting hole and another part extending beyond the second mounting hole, and an outer peripheral wall of the first mounting hole is located at an outer side of an outer peripheral wall of the second mounting hole;
each of the first and second mounting holes comprises a circular hole, and the first mounting hole has a diameter of d and d satisfies: d=2.2±0.5 mm; and
cross sections of the first and second connecting posts match the first and second mounting holes respectively, and the first connecting post has an outer diameter of D, and D satisfies: D=2.2±0.5 mm.

20. A plug assembly comprising:
a plug body defining at least one mounting through hole extending through the plug body; and
at least one connecting post passing through the mounting through hole, the connecting post having a first end located in the mounting through hole to be configured for plug-in connection with a terminal of a compressor, and a second end extending beyond the mounting through hole to be configured for connection with a control board,
wherein the first end of the connecting post is open to form a socket, the socket defines two open slots in an outer peripheral wall thereof, and the two open slots extend through the outer peripheral wall of the socket and are disposed opposite each other in a radial direction of the connecting post.

21. A plug assembly comprising:
a plug body defining at least one mounting through hole extending through the plug body; and
at least one connecting post passing through the mounting through hole, the connecting post having a first end located in the mounting through hole to be configured for plug-in connection with a terminal of a compressor, and a second end extending beyond the mounting through hole to be configured for connection with a control board,
wherein a side of the plug body configured to be adjacent to the control board is provided with at least three bosses, and a free end of each of the at least three bosses is configured to abut against the control board, and
wherein the at least three bosses are dimensioned such that when an end surface of the free end of each of the at least three bosses abuts against the control board, the second end of the connecting post passes through a mounting hole of the control board.

* * * * *